(12) United States Patent
Steinke et al.

(10) Patent No.: US 9,242,397 B2
(45) Date of Patent: *Jan. 26, 2016

(54) MELAMINE RESIN FOAM WITH INORGANIC FILLING MATERIAL

(75) Inventors: Tobias Heinz Steinke, Speyer (DE); Tatiana Ulanova, Ludwigshafen (DE); Klaus Hahn, Kirchheim (DE); Horst Baumgartl, Ludwigshafen (DE); Christof Möck, Mannheim (DE); Bernhard Vath, Mannheim (DE); Peter Nessel, Ludwigshafen (DE); Jens-Uwe Schierholz, Bensheim (DE); Bettina Wester, Maxdorf (DE); Hans-Jürgen Quadbeck-Seeger, Bad Dürkheim (DE)

(73) Assignee: BASF SE, Ludwigshafen (DE)

( * ) Notice: Subject to any disclaimer, the term of this patent is extended or adjusted under 35 U.S.C. 154(b) by 971 days.

This patent is subject to a terminal disclaimer.

(21) Appl. No.: 13/286,370

(22) Filed: Nov. 1, 2011

(65) Prior Publication Data

US 2012/0112116 A1    May 10, 2012

Related U.S. Application Data

(60) Provisional application No. 61/410,365, filed on Nov. 5, 2010.

(51) Int. Cl.
| | |
|---|---|
| *C08J 9/00* | (2006.01) |
| *B29C 44/02* | (2006.01) |
| *C08G 18/32* | (2006.01) |
| *C08G 12/32* | (2006.01) |
| *B29C 44/56* | (2006.01) |
| *C08J 9/14* | (2006.01) |
| *E04B 1/74* | (2006.01) |
| *G10K 11/162* | (2006.01) |
| *B29K 303/04* | (2006.01) |
| *B29K 105/04* | (2006.01) |
| *B29C 35/08* | (2006.01) |
| *B29K 105/00* | (2006.01) |
| *B29L 31/10* | (2006.01) |

(52) U.S. Cl.
CPC ............ *B29C 44/02* (2013.01); *B29C 44/5609* (2013.01); *B29C 44/5636* (2013.01); *C08G 12/32* (2013.01); *C08G 18/32* (2013.01); *C08J 9/008* (2013.01); *C08J 9/009* (2013.01); *C08J 9/0066* (2013.01); *C08J 9/0085* (2013.01); *C08J 9/141* (2013.01); *B29C 35/0805* (2013.01); *B29C 2035/0855* (2013.01); *B29C 2035/0861* (2013.01); *B29K 2105/0026* (2013.01); *B29K 2105/045* (2013.01); *B29K 2303/04* (2013.01); *B29K 2995/0002* (2013.01); *B29K 2995/0015* (2013.01); *B29L 2031/10* (2013.01); *C08J 2203/14* (2013.01); *C08J 2205/05* (2013.01); *C08J 2361/28* (2013.01); *E04B 2001/742* (2013.01); *G10K 11/162* (2013.01)

(58) Field of Classification Search
CPC .... C08J 2361/28; C08J 9/0066; C08J 9/0085; C08J 9/008; C08J 2203/14; C08J 2205/05; C08J 9/009; C08J 9/141; C08G 12/32; B29C 35/0805; B29C 44/02; B29C 44/5609; B29C 2035/0855; B29C 2035/0861; B29K 2105/0026; B29K 2105/045; B29K 2303/04; B29K 2995/0002; B29K 2995/0015; B29L 2031/10; E04B 2001/742; G10K 11/162
USPC ............ 521/82, 86, 91, 92, 99, 122, 123, 187
See application file for complete search history.

(56) References Cited

U.S. PATENT DOCUMENTS

| | | | |
|---|---|---|---|
| 4,666,948 A | 5/1987 | Woerner et al. | |
| 6,608,118 B2 | 8/2003 | Kosaka et al. | |
| 8,697,764 B2* | 4/2014 | Ulanova et al. | 521/91 |
| 2001/0041753 A1 | 11/2001 | Thom | |
| 2007/0157948 A1* | 7/2007 | Gonzales et al. | 134/6 |
| 2007/0213417 A1 | 9/2007 | Stork et al. | |
| 2007/0259979 A1* | 11/2007 | Lee | 521/64 |
| 2007/0267609 A1* | 11/2007 | Ratzsch et al. | 252/607 |
| 2008/0280126 A1 | 11/2008 | Lenz et al. | |
| 2011/0124754 A1 | 5/2011 | Alteheld et al. | |
| 2011/0189464 A1 | 8/2011 | Steinke et al. | |
| 2011/0237145 A1 | 9/2011 | Steinke et al. | |
| 2011/0237699 A1 | 9/2011 | Steinke et al. | |
| 2011/0269864 A1 | 11/2011 | Steinke et al. | |
| 2011/0309539 A1 | 12/2011 | Steinke et al. | |

FOREIGN PATENT DOCUMENTS

| | | |
|---|---|---|
| DE | 10 2007 009127 | 9/2007 |
| DE | 10 2007 009127 A1 | 9/2007 |
| EP | 111 860 A2 | 6/1984 |
| EP | 0 451 535 A1 | 10/1991 |
| EP | 1146070 A2 | 10/2001 |
| EP | 1 519 972 B1 | 10/2006 |
| WO | WO 03/106524 | 12/2003 |
| WO | WO-2005/103107 A1 | 11/2005 |
| WO | WO-2007/23118 A2 | 3/2007 |
| WO | WO-2007/031944 A2 | 3/2007 |
| WO | WO-2009/021963 A1 | 2/2009 |
| WO | WO 2011/061178 | 5/2011 |
| WO | WO 2011/141395 | 11/2011 |
| WO | WO 2012/059493 | 5/2012 |

OTHER PUBLICATIONS

U.S. Appl. No. 13/233,499, filed Sep. 15, 2011, Baumgartl et al.
U.S. Appl. No. 61/316,839, filed Mar. 24, 2010, Steinke et al.
U.S. Appl. No. 13/312,707, filed Dec. 6, 2011, Steinke et al.
International Search Report, PCT/EP2011/069199, mailed Feb. 2, 2012.

* cited by examiner

*Primary Examiner* — John Cooney
(74) *Attorney, Agent, or Firm* — Drinker Biddle & Reath LLP

(57) ABSTRACT

Melamine-formaldehyde foams comprise from 80% to 98% by weight of an inorganic filling material, wherein the % by weight are based on the total weight of inorganic filling material plus melamine-formaldehyde precondensate used for foam production.

11 Claims, No Drawings

MELAMINE RESIN FOAM WITH INORGANIC FILLING MATERIAL

CROSS-REFERENCE TO RELATED APPLICATION

This application claims the benefit of U.S. Provisional Application Ser. No. 61/410,365 filed Nov. 5, 2010, the entire contents of which are incorporated herein by reference in its entirety.

FIELD OF THE INVENTION

The present invention concerns melamine resin foams, processes for their production and their use.

BACKGROUND

EP-A-1 146 070 and WO-A-2007/23118 disclose impregnating with an ammonium salt and with sodium silicate, respectively, to improve the fire characteristics of melamine-formaldehyde foams. These leave something to be desired in their mechanical properties, however.

DE-A-10 2007 009127 discloses fiber-reinforced foams based on melamine-formaldehyde resins having a fiber content of 0.5% to 50% by weight. The fibrous filler used comprises short or long fibers of glass, carbon or melamine resin.

WO-A-2009/021963 discloses a process for producing an abrasive foam on the basis of a melamine-formaldehyde condensation product comprising 0.01% to 50% by weight of inorganic nanoparticles based on the weight of the precondensate.

BRIEF SUMMARY

It is an object of the present invention to remedy the aforementioned disadvantages, more particularly to provide melamine resin foams having improved fire properties coupled with good mechanical properties.

We have found that this object is achieved by novel melamine-formaldehyde foams comprising from 80% to 98% by weight of an inorganic filling material, wherein the % by weight are based on the total weight of inorganic filling material plus melamine-formaldehyde precondensate used for foam production.

The melamine-formaldehyde foams of the present invention comprise generally from 80% to 98% by weight, preferably from 80% to 95% by weight, more preferably from 85% to 95% by weight and even more preferably from 85% to 90% by weight of one or more, i.e., 1 to 10, preferably 1 to 5, more preferably 1 to 3, even more preferably 1 or 2 and most preferably 1 inorganic filling materials, wherein the % by weight are all based on the total weight of inorganic filling material plus melamine-formaldehyde precondensate used for foam production.

DETAILED DESCRIPTION OF THE PREFERRED EMBODIMENTS

Useful inorganic filling materials are sands based on quartz, olivine, basalt, glass spheres, glass fibers, ceramic spheres consisting of for example: zirconium oxide, zirconium silicate, wollastonite, mica, calcium carbonate, glass ceramic spheres, clay minerals such as for example kaolin, sulfates such as calcium sulfate and barium sulfate, carbonates such as calcium carbonate, and dolomite CaMg$(CO_3)_2$, kieselguhr, silicates, such as aluminum silicate and calcium silicate, such as wollastonite $CaSiO_3$, silimanite $Al_2SiO_5$, nepheline $(Na,K)AlSiO_4$, andalusite $Al_2[O|SiO_4]$, feldspar $(Ba,Ca,Na,K,NH_4)(Al,B,Si)_4O_8$, sheet-silicates, such as montmorillonite (smectite) $(Al,Mg,Fe)_2[(OH)_2|(Si,Al)_4O_{10}]Na_{0.33}(H_2O)_4$, vermiculite $Mg_2(Al,Fe,Mg)[(OH)_2|(Si,Al)_4O_{10}].Mg_{0.35}(H_2O)_4$, allophane $Al_2[SiO_5]_6O_3.n\ H_2O$, kaolinite $Al_4[(OH)_8|Si_4O_{10}]$, halloysite $Al_4[(OH)_8|Si_4O_{10}]2\ H_2O$, mullite $Al_8[(O,OH,F)|(Si,Al)O_4]_4$, talcum $Mg_3Si_4O_{10}(OH)_2$, hydrous sulfates $Ca[SO_4].2\ H_2O$, mica, for example muscovite, colloidal silica or mixtures thereof, preferably granular minerals, such as sands and glass spheres, preferably glass spheres.

The inorganic filling materials generally have an average particle diameter (Z average via light scattering, Malvern, Fraunhofer diffraction) in the range from 0.03 mm to 3 mm, preferably in the range from 0.05 mm to 2 mm, more preferably in the range from 0.1 to 1 mm and even more preferably in the range from 0.1 to 0.5 mm. Particularly preferred inorganic filling materials having these average particle diameters are present in particle form, preferably the ratio of the longest axis to the shortest axis of the particles is in the range from 4:1 to 1:1, and spherical filling materials are particularly preferred.

The inorganic filling materials can be used coated or uncoated. The amount of the coating material can be varied within wide limits and is generally in the range from 1 to 20% by weight, preferably in the range from 1 to 10% by weight and more preferably in the range from 1 to 5% by weight based on the filling material, advantageously the amount of coating material used is the minimum sufficient to ensure coating.

Useful coating materials include polymeric entities for example melamine-formaldehyde resins. Suitable polyurethane resins, polyester resins or epoxy resins for coating are known to a person skilled in the art. Such resins may be found for example in Encyclopedia of Polymer Science and Technology (Wiley) under the following chapter headings: a) Polyesters, unsaturated: Edition 3, Vol. 11, 2004, pp. 41-64; b) Polyurethanes: Edition 3, Vol. 4. 2003, pp. 26-72 and c) Epoxy resins: Edition 3, Vol. 9, 2004, pp. 678-804. Furthermore, Ullmann's Encyclopedia of Industrial Chemistry (Wiley) contains the following chapters: a) Polyester resins, unsaturated: Edition 6, Vol. 28, 2003, pp. 65-74; b) Polyurethanes: Edition 6, Vol. 28, 2003, pp. 667-722 and c) Epoxy resins: Edition 6, Vol. 12, 2003, pp. 285-303. Furthermore, amino- or hydroxy-functionalized polymers, more particularly a polyvinylamine or polyvinyl alcohol can be used. It is similarly possible to use inorganic coating materials based on phosphate, silicate and borate groups or combinations thereof.

The inorganic filling materials may also display chemical functionalizations at their surface to improve attachment to the foam structure. The chemical functionalization of the surfaces of inorganic filling materials is known in principle to a person skilled in the art and is described in WO 2005/103107 for example.

The melamine-formaldehyde foams of the present invention comprise an open-cell scaffolding of foam, the scaffolding comprising a multiplicity of interconnected, three-dimensionally branched struts, and in each of which the particulate fillers are embedded into the pore structure. The particle size preferably corresponds to the average pore diameter of the foam structure, this average pore diameter being preferably in the range from 10 to 1000 µm and more particularly in the range from 50 to 500 µm ($d_{50}$ value, number averaged, determined via optical or electronic microscopy combined with image analysis). The particulate fillers can thus be ideally bound into the pore structure of the open-cell foam and immobilized from all sides of the pore scaffolding. Such a structure cannot be produced by subsequent impregnation of the foam with inorganic filling materials, since for this the particle size of the particulate fillers always has to be chosen such that the particle size is smaller than the pore size of the foam in order that distribution in the entire foam may be ensured.

The melamine-formaldehyde precondensates used for producing the melamine-formaldehyde foams of the present invention generally have a molar ratio of formaldehyde to melamine in the range from 5:1 to 1.3:1 and preferably in the range from 3.5:1 to 1.5:1.

These melamine-formaldehyde condensation products, in addition to melamine, may comprise from 0% to 50% by weight, preferably from 0% to 40% by weight, more preferably from 0% to 30% by weight and more particularly from 0% to 20% by weight of other thermoset-formers and, in addition to formaldehyde, from 0% to 50% by weight, preferably from 0% to 40% by weight, more preferably from 0% to 30% by weight and more particularly from 0% to 20% by weight of other aldehydes, in cocondensed form. Preference is given to unmodified melamine-formaldehyde precondensates.

Useful thermoset-formers include for example alkyl- and aryl-substituted melamine, urea, urethanes, carboxamides, dicyandiamide, guanidine, sulfurylamide, sulfonamides, aliphatic amines, glycols, phenol or their derivatives.

Useful aldehydes include for example acetaldehyde, trimethylolacetaldehyde, acrolein, benzaldehyde, furfural, glyoxal, glutaraldehyde, phthalaldehyde, terephthalaldehyde or their mixtures. Further details concerning melamine-formaldehyde condensation products are found in Houben-Weyl, Methoden der organischen Chemie, volume 14/2, 1963, pages 319 to 402.

The melamine-formaldehyde foams of the present invention are obtainable as follows:

A melamine-formaldehyde precondensate and a solvent can be foamed with an acid, a dispersant, a blowing agent and inorganic filling material at temperatures above the boiling temperature of the blowing agent and subsequently dried.

In one particular embodiment, the inorganic filling materials are coated by methods known to a person skilled in the art. This can be accomplished for example by means of a spraying apparatus in a mixing apparatus (for example an intensive mixer from Eirich). Homogeneous wetting of the filling materials is achieved in this way. In one particular embodiment, the coating material is not allowed to fully harden in order that attachment in the foam may be increased.

As melamine-formaldehyde precondensates there may be used specially prepared (see reviews: a) W. Woebcken, Kunststoffhandbuch 10. Duroplaste, Munich, Vienna 1988, b) Encyclopedia of Polymer Science and Technology, $3^{rd}$ edition, Vol. 1, Amino Resins, pages 340 to 370, 2003 c) Ullmann's Encyclopedia of Industrial Chemistry, 6th edition, Vol. 2, Amino Resins, pages 537 to 565. Weinheim 2003) or commercially available precondensates of the two components, melamine and formaldehyde. The melamine-formaldehyde precondensates generally have a molar ratio of formaldehyde to melamine in the range from 5:1 to 1.3:1 and preferably in the range from 3.5:1 to 1.5:1.

A preferred version of the process for producing the foam of the present invention comprises the stages of
(1) producing a suspension comprising a melamine-formaldehyde precondensate of the foam to be produced, particulate fillers and optionally further added components,
(2) foaming the precondensate by heating the suspension from step (1) to a temperature above the boiling temperature of the blowing agent,
(3) drying the foam obtained from step (2).

The individual process steps and the various possible versions will now be more particularly discussed.

The melamine-formaldehyde precondensate may be prepared in the presence of alcohols, for example methanol, ethanol or butanol in order that partially or fully etherified condensates may be obtained. Forming the ether groups is a way of influencing the solubility of the melamine-formaldehyde precondensate and the mechanical properties of the fully cured material.

Anionic, cationic and nonionic surfactants and also mixtures thereof can be used as dispersant/emulsifier.

Useful anionic surfactants include for example diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl and alkylether phosphates. Useful nonionic surfactants include alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters and alkylpolyglycosides. Useful cationic emulsifiers include for example alkyltriammonium salts, alkylbenzyldimethylammonium salts and alkylpyridinium salts.

The dispersants/emulsifiers can be added in amounts from 0.2% to 5% by weight, based on the melamine-formaldehyde precondensate.

The dispersants/emulsifiers and/or protective colloids can in principle be added to the crude dispersion at any time, but they can also already be present in the solvent at the time the microcapsule dispersion is introduced.

In principle, the process of the present invention can use both physical and chemical blowing agents.

Depending on the choice of melamine-formaldehyde precondensate, the mixture comprises a blowing agent. The amount of blowing agent in the mixture generally depends on the desired density for the foam.

"Physical" or "chemical" blowing agents are suitable (Encyclopedia of Polymer Science and Technology, Vol. I, $3^{rd}$ ed., Additives, pages 203 to 218, 2003).

Useful "physical" blowing agents include for example hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), alcohols, for example methanol, ethanol, n-propanol or isopropanol, ethers, ketones and esters, for example methyl formate, ethyl formate, methyl acetate or ethyl acetate, in liquid form or air, nitrogen or carbon dioxide as gases.

Useful "chemical" blowing agents include for example isocyanates mixed with water, releasing carbon dioxide as active blowing agent. It is further possible to use carbonates and bicarbonates mixed with acids, in which case carbon dioxide is again produced. Also suitable are azo compounds, for example azodicarbonamide.

In a preferred embodiment of the invention, the mixture further comprises at least one blowing agent. This blowing agent is present in the mixture in an amount of 0.5% to 60% by weight, preferably 1% to 40% by weight and more preferably 1.5% to 30% by weight, based on the melamine-formaldehyde precondensate. It is preferable to add a physical blowing agent having a boiling point between 0 and 80° C.

As curatives it is possible to use acidic compounds which catalyze the further condensation of the melamine resin. The amount of these curatives is generally in the range from 0.01% to 20% by weight and preferably in the range from 0.05% to 5% by weight, all based on the precondensate. Useful acidic compounds include organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides and mixtures thereof.

In a further embodiment, in addition to the melamine-formaldehyde precondensate of the foam to be produced and the inorganic filling materials, the mixture also comprises an emulsifier and also optionally a curative and optionally a blowing agent.

In a further embodiment, the mixture is free of further added substances. However, for some purposes it can be advantageous to add from 0.1% to 20% by weight, preferably from 0.1% to 10% by weight, based on the melamine-formaldehyde precondensate, of customary added substances other than the inorganic filling materials, such as dyes, flame retardants, UV stabilizers, agents for reducing the toxicity of fire gases or for promoting carbonization, scents, optical brighteners or pigments. These added substances preferably form a homogeneous distribution in the foam.

Useful pigments include for example the common organic pigments. These pigments can be mixed with the particulate filler beforehand.

To ensure good fire protection, the proportion of organic constituents in the foam further to the melamine-formaldehyde resin should be as low as possible. Preference is given to foams wherein the proportion of further organic constituents is so low that they pass the A2 fire test of DIN EN 13501-1.

The next step of the process of the present invention comprises the precondensate being foamed up generally by heating the suspension of the melamine-formaldehyde precondensate and of the inorganic filling materials to obtain a foam comprising the inorganic filling materials. To this end, the suspension is generally heated to a temperature above the boiling point of the blowing agent used and foamed in a closed mold.

The introduction of energy may preferably be effected via electromagnetic radiation, for example via high-frequency radiation at 5 to 400 kW, preferably 5 to 200 kW and more preferably 9 to 120 kW per kilogram of the mixture used in a frequency range from 0.2 to 100 GHz, preferably 0.5 to 10 GHz. Magnetrons are a useful source of dielectric radiation, and one magnetron can be used or two or more magnetrons at the same time.

The foams produced are finally dried, removing residual water and blowing agent from the foam.

An aftertreatment can also be utilized to hydrophobicize the foam. This aftertreatment preferably employs hydrophobic coating agents having high thermal stability and low flammability, for example silicones, siliconates or fluorinated compounds.

The process described provides blocks/slabs of foam, which can be cut to size in any desired shapes.

The foam blocks or slabs can optionally be thermocompressed in a further process step. Thermocompression as such is known to a person skilled in the art and described for example in WO 2007/031944, EP-A 451 535, EP-A 111 860 and U.S. Pat. No. 6,608,118. Thermocompression often provides better fixing of the inorganic filling materials to the open-cell structure of foam.

The density of the foam is generally in the range from 3 to 100 kg/m$^3$, preferably in the range from 10 to 100 kg/m$^3$, more preferably in the range from 15 to 85 kg/m$^3$ and more preferably in the range from 40 to 75 kg/m$^3$.

The foam obtainable by the process of the present invention preferably has an open-cell structure having an open-cell content, when measured to DIN ISO 4590, of more than 50% and more particularly more than 80%.

The average pore diameter is preferably in the range from 10 to 1000 μm and more particularly in the range from 50 to 500 μm ($d_{50}$ value, number averaged, determined via optical or electron microscopy combined with image analysis).

The foam of the present invention is preferably elastic. Melamine-formaldehyde foams having high inorganic contents ranging from 80% to 98% by weight generally pass the A2 fire test of DIN EN ISO 13501-1.

The foam obtainable by the process of the present invention can be used in various ways for thermal and acoustic insulation in building construction and in automobile, ship and track vehicle construction, the construction of spacecraft or in the upholstery industry, for example for thermal insulation in house building or as a sound-insulating material, for example in automobiles, airplanes, trains, ships, etc. in passenger cells or in the engine compartment or for cushioning sitting and lying surfaces and also for back and arm rests. Applications are preferably in sectors requiring high thermal stability and low flammability, for example in pore burners. The material is also useful for insulation in the environment of potent radiation that decomposes organic materials in the long term, for example nuclear power plants. The material can further be used as a "sponge" in the cleaning industry for in the cleaning of surfaces for example in the form of sponges or saturated with cleaning agents of any kind.

In particular applications it can be advantageous for the surface of the foams of the present invention to be laminated with a lamination known in principle to a person skilled in the art. Such lamination may be effected for example, with substantial retention of the acoustical properties, with so-called "open" systems, for example perforated plates, or else with "closed" systems, for example foils or plates of plastic, metal or wood.

The melamine resin foams of the present invention evince an improved combination of fire properties and mechanical properties.

EXAMPLES

Utilized standards and methods of measurement:

DIN EN 13501-1—Fire classification of construction products and building elements: This European standard mandates the methods of classifying the fire behavior of construction products including the products within building elements.

A construction product intended for class A2 has to be tested either to EN ISO 1182 or EN ISO 1716. Additionally, all construction products intended for class A2 have to be tested to EN 13823.

EN ISO 1716—Test method for heat of combustion:

This test method determines the potential maximum amount of heat released by a construction product on complete combustion, without reference to its practical use. The test method is relevant for classes A1 and A2. The test method makes it possible to determine not only the superior calorific value but also the inferior calorific value.

EN ISO 1182—Non-combustibility test:

This test determines which construction products make no or no significant contribution to a fire without reference to their practical use. The test method is relevant for classes A1 and A2.

EN 13823—Test method for single burning item (SBI):

This test method evaluates the potential contribution made by a construction product to a developing fire in a fire situation that simulates a single burning item (SBI) in the corner of a room close to this construction product. The test method is relevant to classes A2, B, C and D.

The A2 fire class in the subsequent inventive and comparative examples was determined to EN ISO 1716 and EN 13823.

Mechanical properties, elasticity:

Ram pressure measurements for evaluating the mechanical quality of the melamine resin foams were carried out as described in U.S. Pat. No. 4,666,948. A cylindrical ram having a diameter of 8 mm and a height of 10 cm was pressed into a cylindrical sample having a diameter of 11 cm and a height of 5 cm in the direction of foaming at an angle of 90° until the sample tore. The tearing force [N], hereinafter also referred to as ram pressure value, provides information as to the mechanical quality of the foam.

Comparative Example A

Preparation of a melamine-formaldehyde foam without filling materials (according to WO-A-2009/021963).

75 parts by weight of a spray-dried melamine-formaldehyde precondensate (molar ratio 1:3) were dissolved in 25 parts by weight of water, then 3% by weight of formic acid, 2% by weight of a sodium $C_{12}/C_{14}$-alkyl sulfate, 38% by weight of pentane, all based on the precondensate, were added, this was followed by stirring and then foaming in a polypropylene mold (for foaming) by irradiation with microwave energy. After foaming, the foam was dried for 30 minutes.

The melamine-formaldehyde foam has a density of 3.5 g/l and a ram pressure value of 10.4 N. The foam does not meet the A2 fire class requirements of DIN EN 13501-1.

Comparative Example B

Preparation of a melamine-formaldehyde foam using 75% by weight, based on the total weight of inorganic filling material plus melamine-formaldehyde precondensate used for foam production, of glass spheres as filling material:

75 parts by weight of a spray-dried melamine-formaldehyde precondensate (molar ratio 1:3) were dissolved in 25 parts by weight of water, 3% by weight of formic acid, 2% by weight of a sodium $C_{12}/C_{14}$-alkyl sulfate, 38% by weight of pentane, the % by weight each being based on the precondensate, and 225 parts by weight of glass beads of the Microbeads type (particle size distribution ("PSD") in the range from 0.2 to 0.3 mm, average particle diameter 0.25 mm, Sigmund Lindner GmbH) were added, which were followed by stirring and then foaming in a polypropylene mold (for foaming) by irradiation with microwave energy. After foaming, the foam was dried for 30 minutes.

The melamine-formaldehyde foam has a density of 18 g/l and a ram pressure value of 23.7 N. The foam does not meet the A2 fire class requirements of DIN EN 13501-1.

Comparative Example C

Preparation of a melamine-formaldehyde foam using 77.5% by weight, based on the total weight of inorganic filling material plus melamine-formaldehyde precondensate used for foam production, of glass spheres as filling material:

Comparative example B was repeated except that 258 parts by weight of glass beads of the Microbeads type (PSD in the range from 0.2 to 0.3 mm, average particle diameter 0.25 mm, Sigmund Lindner GmbH) were used.

The melamine-formaldehyde foam has a density of 21 g/l. The foam does not meet the A2 fire class requirements of DIN EN 13501-1.

Comparative Example D

Preparation of a melamine-formaldehyde foam using 90% by weight, based on the total weight of inorganic filling material plus melamine-formaldehyde precondensate used for foam production, of glass spheres as filling material:

Comparative example B was repeated except that 675 parts by weight of glass beads of the Microbeads type (PSD in the range from 0 to 0.2 mm, average particle diameter 0.01 mm, Sigmund Lindner GmbH) were used.

No flexible foam was obtained.

Inventive Example 1

Preparation of a melamine-formaldehyde foam using 80% by weight, based on the total weight of inorganic filling material plus melamine-formaldehyde precondensate used for foam production, of glass beads as filling material:

75 parts by weight of a spray-dried melamine-formaldehyde precondensate (molar ratio 1:3) were dissolved in 25 parts by weight of water, 3% by weight of formic acid, 2% by weight of a sodium $C_{12}/C_{14}$-alkyl sulfate, 38% by weight of pentane, the % by weight each being based on the precondensate, and 300 parts by weight of glass beads of the Microbeads type (PSD in the range from 0.2 to 0.3 mm, average particle diameter 0.25 mm, Sigmund Lindner GmbH) were added, which were followed by stirring and then foaming in a polypropylene mold (for foaming) by irradiation with microwave energy. After foaming, the foam was dried for 30 minutes.

The foam has a density of 27 g/l and a ram pressure value of 22.5 N and did meet the A2 fire class requirements of DIN EN 13501-1.

Inventive Example 2

Preparation of a melamine-formaldehyde foam using 90% by weight, based on the total weight of inorganic filling material plus melamine-formaldehyde precondensate used for foam production, of glass beads as filling material:

Inventive example 1 was repeated except that 675 parts by weight of glass beads of the Microbeads type (PSD in the range from 0.2 to 0.3 mm, average particle diameter 0.25 mm, Sigmund Lindner GmbH) were used.

The foam has a density of 51 g/l, a ram pressure of 13.5 N and does meet the A2 fire class requirements of DIN EN 13501-1.

Inventive Example 3

Preparation of a melamine-formaldehyde foam using 90% by weight, based on the total weight of inorganic filling material plus melamine-formaldehyde precondensate used for foam production, of glass beads as filling material:

Inventive example 1 was repeated except that 675 parts by weight of glass beads of the Microbeads type (PSD in the range from 0.04 to 0.07 mm, average particle diameter 0.06 mm, Sigmund Lindner GmbH) were used.

The foam has a density of 51 g/l, a ram pressure of 5.8 N and does meet the A2 fire class requirements of DIN EN 13501-1.

Inventive Example 4

Preparation of a melamine-formaldehyde foam using 90% by weight, based on the total weight of inorganic filling material plus melamine-formaldehyde precondensate used for foam production, of glass beads as filling material:

Inventive example 1 was repeated except that 675 parts by weight of glass beads of the Microbeads type (PSD in the range from 0.07 to 0.11 mm, average particle diameter 0.09 mm, Sigmund Lindner GmbH) were used.

The foam has a density of 51 g/l, a ram pressure of 7.8 N and does meet the A2 fire class requirements of DIN EN 13501-1.

Inventive Example 5

Preparation of a melamine-formaldehyde foam using 90% by weight, based on the total weight of inorganic filling material plus melamine-formaldehyde precondensate used for foam production, of quartz sand as filling material:

Inventive example 1 was repeated except that 675 parts by weight of quartz sand (PSD in the range from 0.3 to 0.7 mm, average particle diameter 0.5 mm) were used.

The foam has a density of 51 g/l, a ram pressure of 3.7 N and does meet the A2 fire class requirements of DIN EN 13501-1.

Inventive Example 6

Preparation of a melamine-formaldehyde foam using 90% by weight, based on the total weight of inorganic filling material plus melamine-formaldehyde precondensate used for foam production, of olivine as filling material:

Inventive example 1 was repeated except that 675 parts by weight of olivine (PSD in the range from 0.25 to 0.5 mm, average particle diameter 0.4 mm, Vanguard 250-500, Sibelco) were used.

The foam has a density of 51 g/l, a ram pressure of 1.6 N and does meet the A2 fire class requirements of DIN EN 13501-1.

Inventive Example 7

Preparation of a melamine-formaldehyde foam using 95% by weight, based on the total weight of inorganic filling material plus melamine-formaldehyde precondensate used for foam production, of Carbolite as filling material:

Inventive example 1 was repeated except that 1425 parts by weight of Carbolite 20/40 (PSD in the range from 0.6 to 0.85 mm, average particle diameter 0.7 mm, Carboceramics) were used.

The foam has a density of 87 g/l, a ram pressure of 6.9 N and does meet the A2 fire class requirements of DIN EN 13501-1.

Inventive Example 8

Preparation of a melamine-formaldehyde foam using 90% by weight, based on the total weight of inorganic filling material plus melamine-formaldehyde precondensate used for foam production, of mullite as filling material:

Inventive example 1 was repeated except that 675 parts by weight of mullite (M72, PSD in the range from 0 to 0.5 mm, average particle diameter 0.25 mm, Nabaltec) were used.

The foam has a density of 63 g/l, a ram pressure of 4.6 N and does meet the A2 fire class requirements of DIN EN 13501-1.

We claim:

1. A melamine-formaldehyde foam comprising from 80% to 98% by weight of an inorganic filling material, wherein the % by weight are based on the total weight of inorganic filling material plus melamine-formaldehyde precondensate used for foam production and wherein the inorganic filling materials have average particle diameters in the range from 0.03 mm to 3 mm and wherein the melamine-formaldehyde foam passes DIN EN 13501-1 for Class A2.

2. The melamine-formaldehyde foam according to claim 1 comprising from 80% to 95% by weight of an inorganic filling material, wherein the % by weight are based on the total weight of inorganic filling material plus melamine-formaldehyde precondensate used for foam production.

3. The melamine-formaldehyde foam according to claim 1 wherein the inorganic filling material used comprises quartz, olivine, basalt, glass spheres, glass fibers, ceramic spheres, clay minerals, sulfates, carbonates, kieselguhr, silicates, colloidal silica or mixtures thereof.

4. The melamine-formaldehyde foam according to claim 1 wherein the inorganic filling materials are particles with a ratio of a long axis to a short axis in the range from 4:1 to 1:1.

5. The melamine-formaldehyde foam according to claim 1 wherein the inorganic filling materials are embedded into the pore structure of the foam and the average particle diameter corresponds to the average pore diameter of the foam structure.

6. The melamine-formaldehyde foam according to claim 1 wherein the density of the melamine-formaldehyde foam is less than 100 g/l.

7. A process for producing the melamine-formaldehyde foam according to claim 1, said process comprising:
   foaming a melamine-formaldehyde precondensate in a solvent with an acid, a dispersant, a blowing agent and inorganic filling material at temperatures above the boiling temperature of the blowing agent; and
   subsequently drying the foam.

8. A thermal or acoustic insulation in building construction, automobile, ship and track vehicle construction, spacecraft construction, or upholstery, said insulation comprising the melamine-formaldehyde foam according to claim 1.

9. The melamine-formaldehyde foam according to claim 1, wherein the inorganic filling materials have average particle diameters in the range from 0.05 mm to 2 mm.

10. The melamine-formaldehyde foam according to claim 1 exhibiting a tearing force in the range of 1.6 N to 22.5 N.

11. The melamine-formaldehyde foam according to claim 1, wherein the inorganic filling materials have average particle diameters in the range from 0.1 mm to 0.5 mm.

* * * * *